Feb. 9, 1954 M. MORRISON 2,668,882

AMPLIFIER

Original Filed April 26, 1949 2 Sheets-Sheet 1

INVENTOR.
Montford Morrison

Feb. 9, 1954 M. MORRISON 2,668,882

AMPLIFIER

Original Filed April 26, 1949 2 Sheets-Sheet 2

INVENTOR.

Montfort Morrison

Patented Feb. 9, 1954 2,668,882

UNITED STATES PATENT OFFICE 2,668,882

AMPLIFIER

Montford Morrison, Upper Montclair, N. J.

Original application April 26, 1949, Serial No. 89,605, now Patent No. 2,623,944, dated December 30, 1952. Divided and this application March 31, 1950, Serial No. 153,239

3 Claims. (Cl. 179—171)

Figure 1:
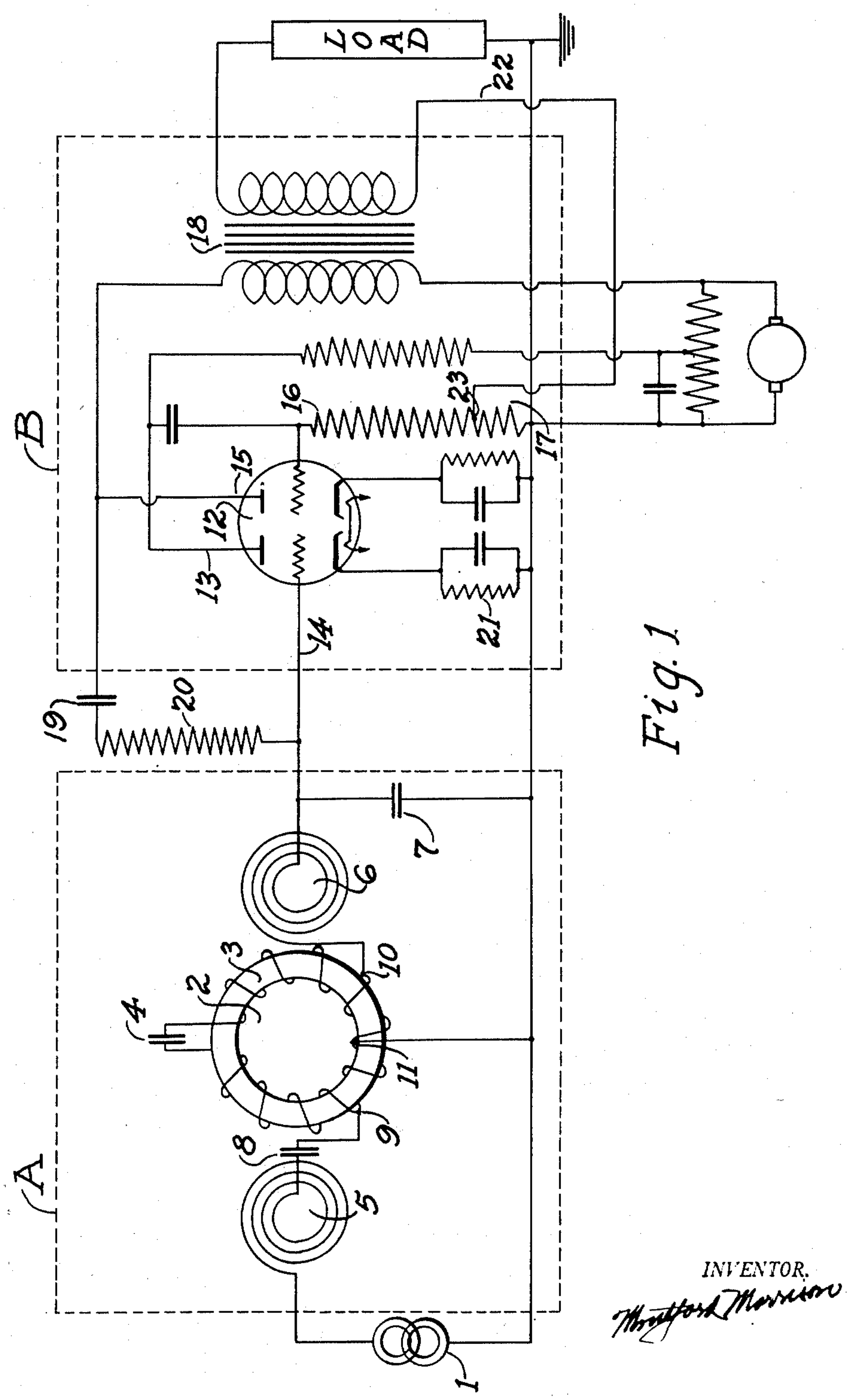

This application is a required division of application 89,605, filed April 26, 1949, now issued December 30, 1952, as Patent No. 2,623,944.

The present invention relates to electric wave filters and to the joint structure resulting from combining electric wave filters with electronic tube amplifier component organizations.

Among the objects of the invention is to provide a band-pass filter which is, much smaller, much lighter, much less expensive to build, than prior art structures, and which makes practical the employment of a multiplicity of carrier-current filter devices in small aircraft and in portable field apparatus. The smallest equivalent prior art filter known to the applicant measures 19″ x 5¼″ x 3¾″ and weighs 10 pounds. A filter equivalent in performance, constructed in accordance with the present invention, measures 5½″ x 2¼″ x ¾″ and weighs 11 ounces.

Another object of the invention is to provide electronic tube amplifier organizations for joint use with filters of this invention, which are much smaller, much lighter, much less expensive to build, and which contribute jointly to the practicability of carrier-current devices in small aircraft and for portable field apparatus. Prior art amplifiers of equivalent performance, are usually more bulky than the filter, but weigh somewhat less. The present amplifier (without power supply) measures 2⅝″ x 2⅝″ x 1¾″ (without output transformer) and the output transformer measures 1⅝″ x 1⅜″. The filter proper weighs 7 ounces and the output transformer weighs 6 ounces.

Such a filter, amplifier and output transformer combination, with 1 milliwatt input into the filter provides more than 1 watt in the secondary of the output transformer, with a single 6F8 tube operating within its published rating, and considerably greater outputs are obtained with plate voltages in excess of this rating or with tubes of higher ratings.

The complete channel organization of the 3 units described, weighs 1½ pounds. Greater output energy is obtained, with the same organization, with greater watt inputs.

Such results are clearly new and obviously unexpected in view of the prior art.

A further object of the invention is to provide a filter having the absolute minimum number of components for the performance provided.

A further object to provide a full two stage filter having a single high Q reactor tank circuit.

A further object is to provide a filter organization, in which energy is fed into the filter at both the input end and at the output end thereof.

A further object is to provide means to feed energy into the output end of a filter at the same time that energy is being fed into the input end thereof, thereby raising the overall Q of the filter, which results in reduction of size, weight and cost, and an increase in sharpness of definition in filter characteristics.

A further object is to provide means to limit or stabilize the above said energy fed into the output end of the filter, to an amount less than the overall losses in the filter, which amount effectively results in decreasing the dissipation losses in the filter and thereby increasing the effective transmission efficiency thereof, and which amount of limitation prevents sustained oscillations in the system, in the absence of energy being fed into the input end of the filter.

A further object is to provide a two stage electronic tube amplifier which has positive feed back into the grid circuit of one or both of the stages, resulting in a greater amount of amplification, for the number of electrodes employed, than in prior art equivalent component organizations.

A further object is to provide one of the above said feed backs with a positive current proportional to the output load current of the amplifier, thereby compensating for output voltage drop, due to the applied load.

The teaching set forth herein, the structure characterized by the disclosure hereof and the methods recited in the claims appended hereto, may be employed in filters and amplifier organizations, other than and different from, that described in the specific embodiment of the invention exemplified in the disclosure thereof, without departing from the spirit of the invention, as will be well understood by those skilled in the art. It is believed that the invention can be taught best, by one clearly defined embodiment, rather than comprehensive generalities.

A good practical description of advanced prior art structure is given in "A New Voice Frequency Telegraph System," Electrical Communication, vol. 10, No. 4.

The spirit of the present invention resides importantly in novel multiple use of single components in an organization thereof.

In the filter structure disclosed herein, a single metallic core high Q tank circuit is employed in low coupling relation to a low Q input circuit and to a low Q output circuit, and which low Q circuits may be air-core coils.

In a band-pass carrier current filter under intermittent operation, such as for instance telegraphic keying, the speed at which the keying modulations will pass through the filter, depends upon the time required by the components of the filter system, having energy storage properties, to be fully energized and the time required for the reverse operation to take place, that is, the time required for these components to de-energize.

When a filter system is once energized and the input energy stopped, energy continues to flow out of the storage components toward both terminals of the filter until the stored energy is exhausted. If the input energy is resumed before the stored energy is exhausted, the minimum to which the stored energy is exhausted importantly determines the operational characteristics of the filter for keying or equivalent operation.

In the published prior art, great stress has been laid upon the time required for the "building up" process in filters under transient input operation, but very little, if anything, has been stressed about the equally important stored energy exhaustion process.

All filter operation theory which has come under notice by the applicant, is based upon the theory that the energy in the filter always travels in one direction at a time and in one direction at a time only, and that direction is either from the input terminal impedance toward the output terminal impedance, or from the output terminal impedance toward the input terminal impedance.

Under this explanation of operation, it is shown that if the terminal impedances are pure resistances of a value equal to the so called characteristic impedance of the filter network, that is, equal to $$\sqrt{\frac{L}{C}}$$

of the network, the flow of energy through the system is in one direction and in one direction only. This is admitted true for filter networks operating under steady state conditions, but it will be shown that $$\sqrt{\frac{L}{C}}$$

is an incorrect value for non-reflection operation under input energy operation where this energy is interrupted. It will be shown hereinafter that for a filter network to function under non-reflection operation, the terminal resistance should be equal to $$2\sqrt{\frac{L}{C}}$$

but satisfactory operation is attained with other neighborhood values.

One aspect of the spirit of the invention resides in the employment of an energy storage system in the filter circuit having a minimum storage capacity for the performance of the filter and with terminal impedances suited to exhaust this energy in an economical period of time.

Another important aspect of the spirit of the filter organiation, is the supplying of energy to the filter to compensate for some of the filter dissipation losses, to supply positive regenerative voltage feed-back to the voltage amplifier and positive load current feed-back to the power amplifier.

Figures 2, 3:
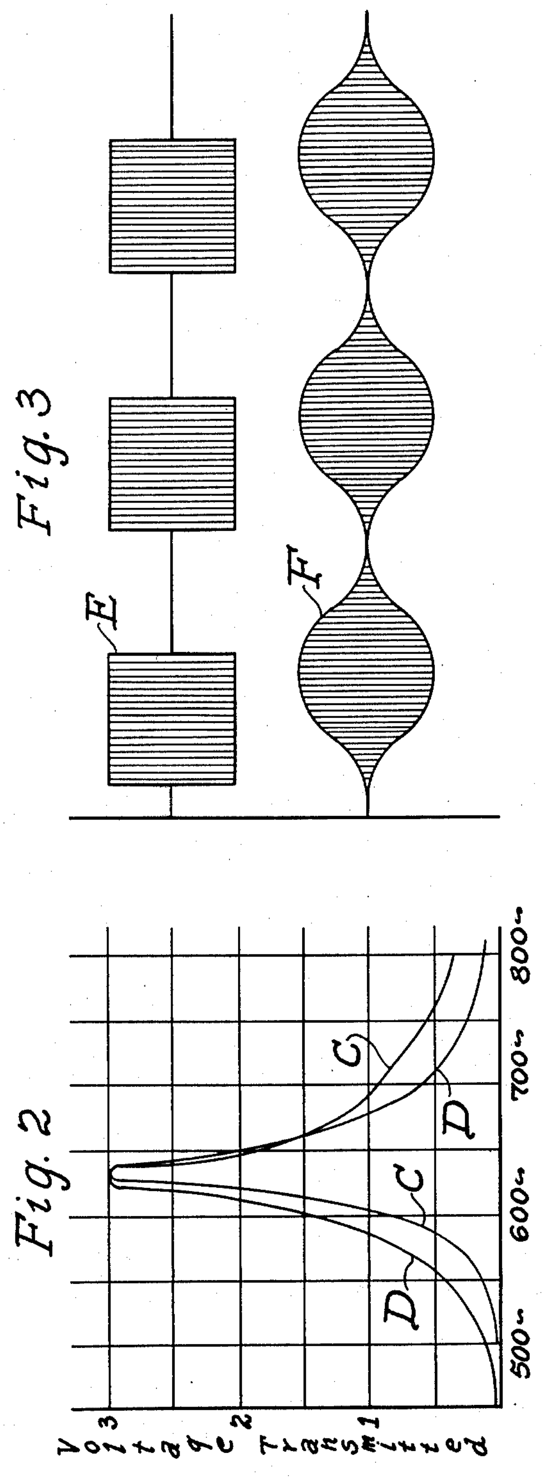
Figures 4, 5:
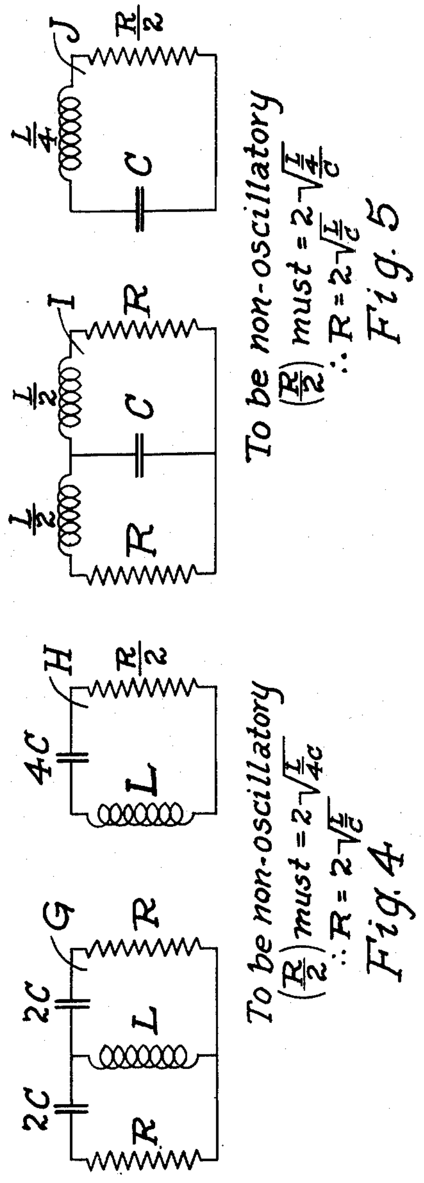

To more clearly disclose the invention, a specific embodiment thereof will be given, as it may be used in an audio-frequency carrier-current telegraph channel, and therefor reference may be had to the accompanying drawings, in which Fig. 1 is a diagram of a complete such channel; Figs. 2 and 3 are curves relating to the operation thereof; and Figs. 4 and 5 are circuits and data illustrating some novel theory involved which may be used to an advantage in said operation.

Referring to Fig. 1, 1 is a source of audio-frequency voltage, the components within the dotted area A represent the filter proper, 2 represents a high Q tank having a reactor 3 and a condenser 4. Reactor 3 has a high permeability compressed dust core of toroidal form with an outside diameter of 1⅜" and a cross-section of ¼" x ⅜"; the core and the coil weigh 2½ ounces; 5 and 6 are "cross-wound" air core reactors having an outside diameter of 1¼", a depth of ½" and a weight of 1¼ ounces. Air core terminal sections are employed because the terminal resistances are included in the coils themselves, since the output of the filter is taken across the terminal condenser 7, the input condenser being 8, there being no point in using high Q high permeability coils with external resistors in series with them.

The input and output circuits are coupled to the high Q tank circuit 2, at points 9 and 10, with a common coupling point 11.

With such an arrangement, a higher voltage is obtained across condenser 7, than the drop across a practical terminal resistance.

Condensers (standard 150 volt rating, which is 10 times voltage rating required) 4, 7 and 8 weigh 3.4 ounces. This makes an active material weight of 8.4 ounces, with 2.6 ounces for hardware and mounting panel.

The organization within the dotted area B is a two stage amplifier employing a twin triode 12, having a voltage amplification plate circuit 13 with a grid input circuit 14, connected across the output condenser 7, of filter A. 15 is power amplification circuit of amplifier B, the grid thereof having grid resistor 16. Grid resistor 16 has a heavy section 17 to carry load current from output transformer 18. Power amplification circuit 15 is coupled through condenser 19 and through feed-back resistor 20 to the output circuit of filter A and to the input circuit 14 of amplifier B.

All resistors and condensers of amplifier B, plus components 19 and 20, are arranged around twin triode 12, to conserve space, instead of in a compartment under the tube.

With such a joint associated organization as A and B, some dissipation losses in A can be compensated for by the feed-back energy from B into A by means of the feed-back circuit 19—20. This feed-back energy in neutralizing some of the dissipation losses of the filter has the effect of raising the overall Q of the filter, which increases the sharpness of definition of the filter cut-off characteristics. This all makes for a smaller, lighter filter. So long as the feed-back energy to the filter does not equal the total filter dissipation losses, the system will not sustain oscillations after the removal of input energy from source 1.

Under normal operation the feed-back energy to the filter is limited or stabilized by the grid conduction in circuit 14. The magnitude of feed-back to filter A, is importantly determined by resistor 20, and the voltage of bias 21. That is, when the crest value of the feed-back voltage equals the bias voltage, the grid circuit becomes conducting and the increased current in resistor 20, caused thereby limits or stabilizes the feed-back current. This grid conduction current also increases the plate current of circuit 13 and thereby increases the voltage amplification of B into the power amplification circuit.

The secondary load circuit of output transformer 18 is connected to the heavy section 17 of grid resistor 16 at the point 23. When load is applied in load circuit 22, the voltage drop across heavy resistor 17, adds to the voltage of grid resistor 16, thereby increasing the power amplification of amplifier B; this amplification is limited or stabilized by high resistor 16 and the grid conduction current in the power amplifier circuit.

Thus both the voltage amplifier and the power amplifier have positive regenerative feed-backs with stabilization.

The coefficient of coupling between high Q tank circuit 2 and the filter input and output circuits can be as low as of the order of 1 or 2 percent, which makes sharp cutoff characteristics in the filter. The loss in transmission efficiency of the filter due to the very low coupling coefficient, is made up by the feed-back energy into the filter circuit, which maintains the sharply defined characteristics of the low coupling coefficient, and provides in effect the higher transmission efficiency of a much larger coupling coefficient.

These properties all make for a smaller, lighter filter.

Fig. 2 shows two different steady state voltage transmission characteristics for a 630 cycle filter and amplifier of the structures above described. Curve C represents the amplifier transformer voltage with a constant filter input voltage for a range above and below the mid-band frequency, when the tank circuit and the input and output circuits are all tuned to 630 cycles. Curve D is for the same filter with the tank circuit tuned to 630 cycles, and the input and output circuits tuned to a lower frequency. Still lower frequency input and output circuit tuning brings the curve into more perfect symmetry about the mid-band frequency and further lowering of the input and output circuit tuning reverses the order of dissymmetry about the mid-band frequency.

Fig. 3 shows the overall voltage transmission characteristics for the same filter of Fig. 2, but under square wave modulation envelopes into the filter input circuit, such as illustrated by envelopes E of Fig. 3. This modulation envelope is the most severe test for such a filter. Envelope F is a good oscillograph trace of the output transformer voltage for a square wave filter input modulation at common marking and spacing speeds, using the tuning employed to obtain curve D of Fig. 2.

The magnitude of amplifier output voltages under the operation illustrated in Fig. 3 for frequencies outside of the transmission band, that is, the "spill-over" for the adjacent channels is only about double the steady state values shown in Fig. 2, by curve D, that means that if the channels are spaced 180 cycles, the output circuit would have present about 2 percent voltage from the lower channel, and about 3 percent voltage from the higher channel. This performance is not equaled by any carrier-current telegraph filter of any size known to the applicant. The applicant does not hold that such performance is impossible with larger filters, but does hold that there is considerable difficulty and cost in attaining such values in prior art filters.

This difficulty is due to a great extent to the much larger amount of stored energy present in multiple section filters, which has to be exhausted from the filter during each spacing interval. In the present invention, with its single small-storage circuit, this difficulty is greatly lessened, with considerable improvement of prior art structures.

Also in a single-core storage unit, less core material is required for the same inductance, for two reasons; first, the same core is used for all the turns of the reactance, and second, the inductance of a coil on a single core is proportional to the square of the number of total turns employed. That means, if four separate coils are used for a filter mid-section, not only are four separate cores required, but also four times the total number of turns. For example, if N turns are required on a certain size single core to obtain a given inductance, this inductance is proportional to $N^2$. If these N turns are equally distributed between 4 cores (as is common practice for a mid-section), the inductance of each coil will be proportional to $$\left(\frac{N}{4}\right)^2$$

and of the 4 coils will be $$4\left(\frac{N}{4}\right)^2$$

which is equal $$\frac{N^2}{4}$$

or, one fourth that of the single core coil, which single coil results in a higher Q (more sharply defined cutoff characteristics) and less stored energy (faster modulation frequency response under transient working).

A further filter improvement can be made, if and when desired, under transient operation, by embodying the following discovery in filter terminal resistances, which may be included in the terminal reactors when indicated.

It is believed that this discovery can be taught by use of simpler filter circuits than that illustrated in B of Fig. 1, because the mathematical theory of such a circuit involves very complex and difficult-to-manage algebra, and the disclosure desired to be made, can be taught very easily by a very simple procedure.

Referring to Fig. 4, circuit G, there is shown a conventional single stage high-pass filter. Conventional filter theory assumes the flow energy in such a filter is always in one direction at a time, that is, it flows from left to right or from right to left. On this basis it is shown that if no reflections are to occur at the filter ends (which is merely another way of saying that the filter will not sustain oscillations of its own accord or that it is a non-oscillatory system), the terminal resistances must each equal the characteristic impedance of the system or $$R=\sqrt{\frac{L}{C}}$$

While most treatments of the subject do not point out that the result is arrived at on a basis of the steady state analysis of the network, that is the case. It is, of course, well known that this result has certain frequency limitations attached to it, but it is the basis of a good working rule for steady state filter operation.

Referring again to Fig. 4, circuit G, if a modulated wave such as E, Fig. 3, is injected into one terminal resistance of G, the "LC" of the circuit has to "fill up" before the steady-state transmission voltage value "shows up" at the other terminal resistance of the filter; that is illustrated by the form of the tracing of the envelope F, Fig. 3, during the crescent interval. While the curves in Fig. 3 are taken from the operation of the band-pass filter of Fig. 1, they can, notwithstanding, be used as illustrating certain operations in filters having only high-pass or low-pass characteristics.

If the filter G has its input energy interrupted when the "LC" of the circuit is "full" of stored energy, the flow of energy ceases to move in one direction; because of the removal of opposing voltage at the input end, the stored energy moves toward that end as well as toward the output end. This means that when the input voltage is removed from circuit G, after steady state operation is attained, circuit G operates exactly as circuit H of the same figure, which is its exact equivalent.

Circuit H is the familiar closed circuit system containing capacity, inductance and resistance in series, represented by the differential equation:

$$\frac{1}{C}\int idt+L\frac{di}{dt}+Ri=0$$

It is well known that for a circuit represented by this equation to be non-oscillatory, R must have a value not less than that represented by the following relation:

$$0=\sqrt{\frac{1}{LC}-\frac{R^2}{4L^2}}$$

or $$R=2\sqrt{\frac{L}{C}}$$

This double value of R, when the energy is flowing in two directions, provides the same resistance "facing" the double flow of the stored energy that the single R provides for the unidirectional flow of energy, because of the resistance being in parallel relation during double flow.

The exact same reasoning can be applied to a low-pass filter, as clearly indicated in Fig. 5, as well as to band-pass filters.

This means that if a filter functions under steady-state working in non-oscillatory operation with terminal resistances each equal to R; for such a filter to function under transitory-state working in non-oscillatory operation, the terminal resistances must be at least equal to 2R.

Referring back to Fig. 1, this means that, if and when desired, the non-oscillatory response of such a circuit can be materially improved by considerably increasing the resistance of the terminal half-sections, over and above that resistance which is equal to the characteristic impedance of the network.

I claim:

1. In a two stage electric-wave narrow-band signal-amplifying system having a first stage including a first set of vacuum tube input and output amplifying elements and a tuned signal circuit having attenuation loss connected to said input elements, a second set of vacuum tube input and output amplifying elements, said second set of input elements having a bridging resistor across the control grid and the cathode thereof, said first output elements being connected to said second input elements, said second output elements being connected to the primary winding of a transformer having an isolated secondary winding having a load included in the circuit thereof, said second set of output elements having a positive feed-back circuit to said first set of input elements, the impedance of said feed-back circuit being sufficient to prevent self-oscillation in said tuned signal circuit, and said isolated secondary winding having a positive feed-back circuit to an intermediate tap of said bridging resistor.

2. In a two stage electric-wave narrow-band signal-amplifying system having a first stage including a first set of vacuum tube input and output amplifying elements and a tuned signal circuit having attenuation loss connected to said input elements, a second set of vacuum tube input and output amplifying elements, said second set of input elements having a bridging resistor across the control grid and the cathode thereof, said first output elements being connected to said second input elements, said second output elements being connected to the primary winding of a transformer having an isolated secondary winding having a load included in the circuit thereof, said second set of output elements having a positive feed-back circuit to said first set of input elements, the impedance of said feed-back circuit being sufficient to prevent self-oscillation in said tuned signal circuit, said isolated secondary winding having a positive feed-back circuit to an intermediate tap of said bridging resistor, and the grid voltage-drop of that portion of said resistor from said tap to the cathode end thereof being only a fraction of the total voltage of said secondary winding.

3. In a two stage electric-wave narrow-band signal-amplifying system having a first stage including a first set of vacuum tube input and output amplifying elements and a tuned signal circuit having attenuation loss connected to said input elements, a second stage including a second set of vacuum tube input and output amplifying elements, said second set of input elements having a bridging resistor across the control grid and the cathode thereof, said first output elements being connected to said second input elements, said second output elements being connected to the primary winding of a transformer having an isolated secondary winding having a load included in the circuit thereof, said second set of output elements having a positive feed-back circuit to said first set of input elements, the impedance of said feed-back circuit being sufficient to prevent self-oscillation in said tuned signal circuit, said isolated secondary winding having a positive feed-back circuit to an intermediate tap of said bridging resistor and the total grid voltage drop of said bridging resistor being less than that required to cause self-oscillation in said second stage.

MONTFORD MORRISON.

References Cited in the file of this patent

UNITED STATES PATENTS

| Number | Name | Date |
|---|---|---|
| 1,668,240 | Green | May 1, 1928 |
| 2,250,829 | Foster | July 29, 1941 |
| 2,272,235 | Boucke | Feb. 10, 1942 |
| 2,285,769 | Forster | June 9, 1942 |
| 2,383,867 | Koch | Aug. 28, 1945 |

OTHER REFERENCES

Terman text: "Radio Engineering," 3d edition, pp. 323–326, published 1947 by McGraw Hill Co. New York city, N. Y. (Copy in Div. 69.)